(12) United States Patent
Miyake et al.

(10) Patent No.: US 12,447,551 B2
(45) Date of Patent: Oct. 21, 2025

(54) METHOD FOR CONTROLLING FRICTION STIR WELDING DEVICE, AND FRICTION STIR WELDING DEVICE

(71) Applicant: KAWASAKI JUKOGYO KABUSHIKI KAISHA, Kobe (JP)

(72) Inventors: Masahiro Miyake, Kobe (JP); Takuya Fukuda, Kobe (JP); Tadahiro Edagawa, Kobe (JP); Norichika Kita, Kobe (JP); Makoto Tsujinaka, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 118 days.

(21) Appl. No.: 18/275,700

(22) PCT Filed: Feb. 7, 2022

(86) PCT No.: PCT/JP2022/004756
§ 371 (c)(1),
(2) Date: Aug. 3, 2023

(87) PCT Pub. No.: WO2022/168981
PCT Pub. Date: Aug. 11, 2022

(65) Prior Publication Data
US 2024/0116129 A1 Apr. 11, 2024

(30) Foreign Application Priority Data
Feb. 8, 2021 (JP) ................. 2021-018427

(51) Int. Cl.
*B23K 20/00* (2006.01)
*B23K 20/12* (2006.01)

(52) U.S. Cl.
CPC ........ *B23K 20/123* (2013.01); *B23K 20/1245* (2013.01)

(58) Field of Classification Search
CPC .. B23K 20/125; B23K 20/126; B23K 20/122; B23K 20/123
See application file for complete search history.

(56) References Cited

U.S. PATENT DOCUMENTS 11,633,802 B2 * 4/2023 Okada ................ B23K 20/1255
                                                       228/112.1
11,911,841 B2 * 2/2024 Miyake ............... B23K 20/1245
(Continued)

FOREIGN PATENT DOCUMENTS

JP      2006-187778 A    7/2006
WO   WO-2019045102 A1 * 3/2019 ........... B23K 20/122

*Primary Examiner* — Erin B Saad
(74) *Attorney, Agent, or Firm* — Oliff PLC

(57) ABSTRACT

In a state where a shoulder member is in contact with a contact surface, a pin member is brought into contact with the contact surface to specify a pin movement amount, which is a distance from an initial position of the pin member to the contact surface, and specify a shoulder displacement amount, which is a displacement amount when the shoulder member is retreated as a result of the contact of the pin member. When both a first condition that the pin movement amount is included in a first range and a second condition that the shoulder displacement amount is included in a second range are satisfied, the pin member is retreated from the contact surface by a predetermined return amount, and furthermore, origin point alignment of the pin member and the shoulder member is performed on the basis of positions of the pin member and the shoulder member.

6 Claims, 9 Drawing Sheets

(56) References Cited

U.S. PATENT DOCUMENTS

| | | | | |
|---|---|---|---|---|
| 12,145,211 | B2* | 11/2024 | Seo | B23K 20/1255 |
| 2009/0294511 | A1* | 12/2009 | Fleming | B23K 20/125 |
| | | | | 228/103 |
| 2019/0314927 | A1* | 10/2019 | Ohashi | B23K 20/1235 |
| 2021/0086291 | A1* | 3/2021 | Okada | B23K 20/1255 |
| 2021/0331421 | A1* | 10/2021 | Okada | B29C 66/8322 |
| 2022/0072653 | A1* | 3/2022 | Hatano | B23K 20/126 |

* cited by examiner

METHOD FOR CONTROLLING FRICTION STIR WELDING DEVICE, AND FRICTION STIR WELDING DEVICE

TECHNICAL FIELD

The present disclosure relates to a control method for performing origin point alignment of a pin member and a shoulder member in a friction stir welding device, and to a friction stir welding device.

BACKGROUND ART

At manufacture of a structure such as an aircraft, a railway vehicle, or an automobile, work of overlapping and welding two or more members made of metal, resin, or the like may be required. As one method of this welding, friction stir welding is known. Friction stir welding is a method of welding a workpiece (body to be welded) by press-fitting a rotating tool into the workpiece to cause plastic flow.

Patent Literature 1 below discloses, as an example of a device for performing friction stir welding, a friction stir welding device provided with a tool including a pin member capable of rotating around an axis and moving forward and backward along the axis, and a shoulder member arranged on an outer peripheral side of the pin member and capable of rotating around the axis and moving forward and backward along the axis. While being rotationally driven, each of the pin member and the shoulder member is press-fitted into a workpiece to cause a plastic flow in the press-fitted part.

Here, in a case of welding a workpiece using the friction stir welding device described above, relative position management of the pin member and the shoulder member is important in order to ensure smoothness of a welded part. Then, in order to accurately perform the relative position management, it is required to perform work of origin point alignment (zeroing) of matching an origin point of the pin member with an origin point of the shoulder member with sufficient accuracy before performing welding work. The origin point alignment work may be manually performed by an operator. In this case, for example, while moving the pin member in a teaching mode, the operator causes distal ends of the pin member and the shoulder member to match with each other visually or manually, and sets origin points of both the members in this state. The origin point alignment by such a method, however, has problems in terms of safety and work efficiency, and there is room for improvement.

CITATION LIST

Patent Literature

Patent Literature 1: JP 2006-187778 A

SUMMARY OF INVENTION

The present disclosure has been made in view of the above circumstances, and an object of the present disclosure is to enable safe and highly efficient origin point alignment of a pin member and a shoulder member in a friction stir welding device.

In order to solve the problem, a control method according to one aspect of the present disclosure is a method for controlling a friction stir welding device that includes a pin member that rotates around an axis and moves forward and backward along the axis, and a shoulder member that is arranged on an outer peripheral side of the pin member, and rotates around the axis and moves forward and backward along the axis, and that welds a workpiece by press-fitting the pin member and the shoulder member into the workpiece while rotating the pin member and the shoulder member, the method including: a first step of storing, as a first shoulder position, a position of the shoulder member in the axial direction in a state where a distal end of the shoulder member is in contact with a predetermined contact surface; a second step of storing, as a first pin position, an initial position of the pin member in the axial direction; a third step of causing the pin member to advance toward the contact surface and storing, as a second pin position, a position of the pin member in the axial direction when a distal end of the pin member contacts the contact surface; a fourth step of storing, as a second shoulder position, a position in the axial direction of the shoulder member retreated as the pin member contacts the contact surface; a fifth step of determining whether or not a first condition is satisfied that a pin movement amount, which is a distance between the first pin position and the second pin position, is included in a predetermined first range, and whether or not a second condition is satisfied that a shoulder displacement amount, which is a distance between the first shoulder position and the second shoulder position, is included in a predetermined second range; a sixth step of causing the pin member to retreat from the contact surface by a predetermined return amount when the first condition and the second condition are satisfied, and performing origin point alignment of the pin member and the shoulder member with reference to positions of the pin member and the shoulder member in the axial direction after the retreat; and a seventh step of causing the pin member to retreat to a restart position farther from the contact surface than the first pin position when at least the first condition is not satisfied, in which after the seventh step, with the position of the pin member retreated to the restart position as a new first pin position, procedures of the second step and subsequent steps are re-executed.

A friction stir welding device according to another aspect of the present disclosure includes: a pin member that rotates around an axis and moves forward and backward along the axis; a shoulder member that is arranged on an outer peripheral side of the pin member, and rotates around the axis and moves forward and backward along the axis; a zeroing control unit that performs origin point alignment of the pin member and the shoulder member; a welding control unit that welds a workpiece by press-fitting the pin member and the shoulder member into the workpiece while rotating the pin member and the shoulder member; and a storage unit that stores data, in which the zeroing control unit is capable of executing: a first processing of causing the storage unit to store, as a first shoulder position, a position of the shoulder member in the axial direction in a state where a distal end of the shoulder member is in contact with a predetermined contact surface; a second processing of causing the storage unit to store, as a first pin position, an initial position of the pin member in the axial direction; a third processing of advancing the pin member toward the contact surface and causing the storage unit to store, as a second pin position, a position of the pin member in the axial direction when a distal end of the pin member contacts the contact surface; a fourth processing of causing the storage unit to store, as a second shoulder position, a position in the axial direction of the shoulder member retreated as the pin member contacts the contact surface; a fifth processing of determining whether or not a first condition is satisfied that a pin movement amount, which is a distance between the first pin position and the second pin position, is included in a predetermined first range, and whether or not a second condition is satisfied that a shoulder displacement amount, which is a distance between the first shoulder position and the second shoulder position, is included in a predetermined second range; a sixth processing of causing the pin member to retreat from the contact surface by a predetermined return amount when the first condition and the second condition are satisfied, and performing origin point alignment of the pin member and the shoulder member with reference to positions of the pin member and the shoulder member in the axial direction after the retreat; and a seventh processing of causing the pin member to retreat to a restart position farther from the contact surface than the first pin position when at least the first condition is not satisfied, and after the seventh processing, with the position of the pin member retreated to the restart position as a new first pin position, the zeroing control unit re-executes the second processing and subsequent processings.

DESCRIPTION OF EMBODIMENTS

In the following, a friction stir welding device according to an embodiment of the present disclosure will be described in detail with reference to the drawings. The friction stir device according to the present embodiment can be applied to manufacture of various welded bodies obtained by overlapping two or more structural members and point-welding the same, the structural members such as a plate, a frame, an exterior material, or a columnar material made of metal, a thermoplastic resin, a thermoplastic composite material obtained by mixing a fiber reinforcement material with a thermoplastic resin, or the like. The welded body to be manufactured is a constituent member of a structure such as an aircraft, a railway vehicle, or an automobile.

[Application Example of Friction Stir Device]

Figure 1:
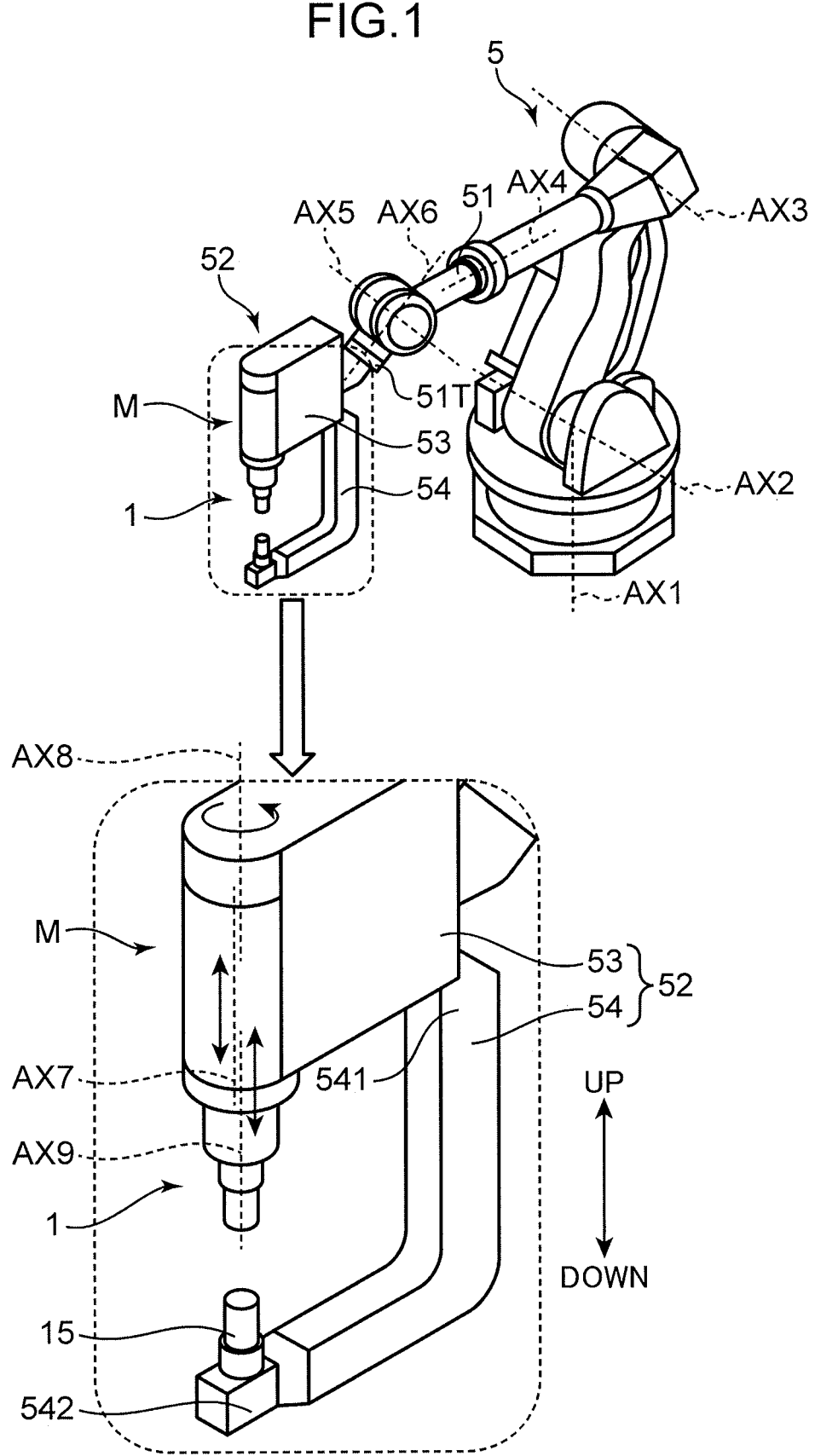
FIG. 1 is a perspective view including an enlarged view of a main part of a robot to which a friction stir device according to an embodiment of the present disclosure is attached.
Figure 2:
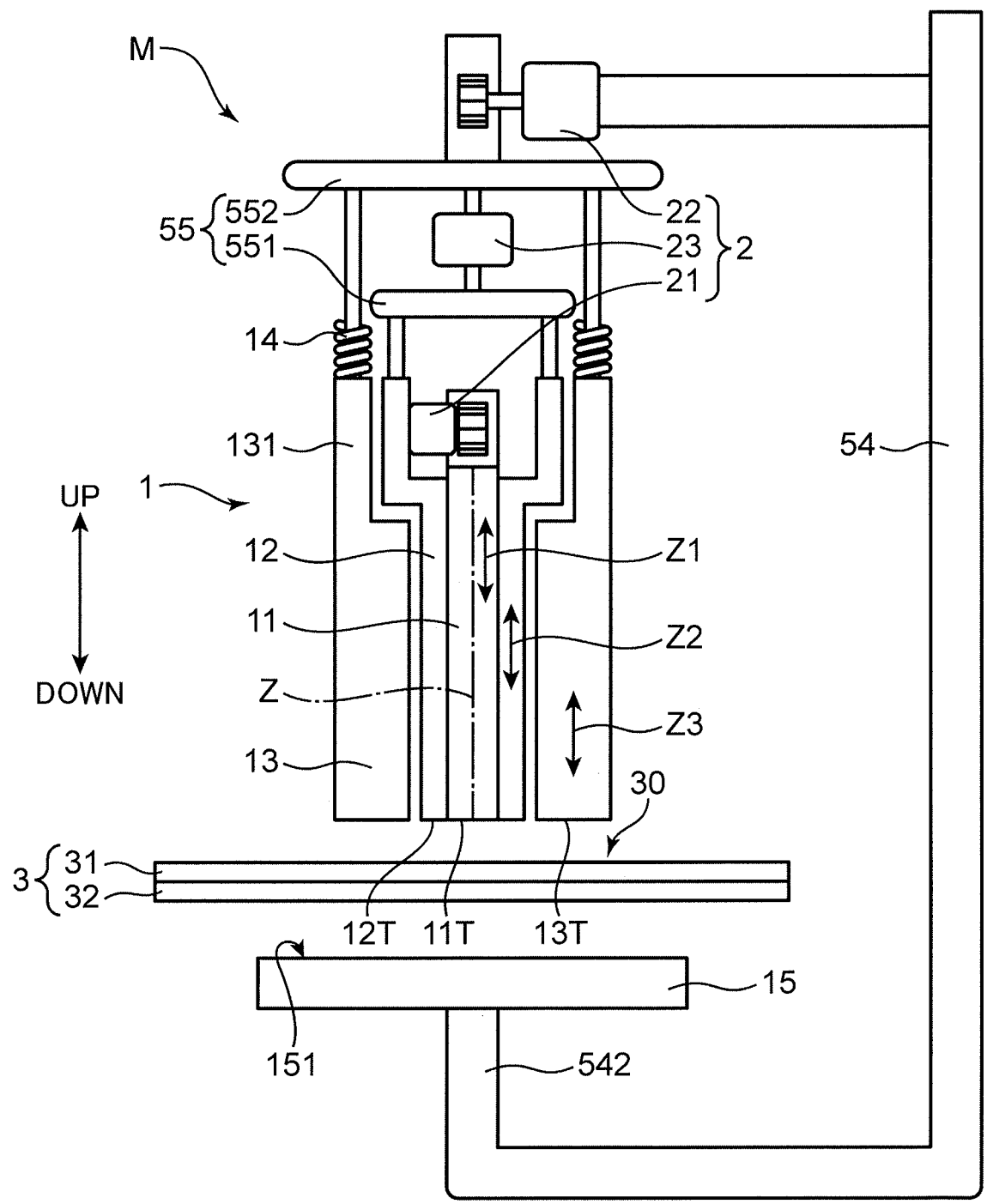
FIG. 2 is a schematic side view showing a mechanical configuration of the friction stir welding device.

FIG. 1 is a perspective view showing an articulated robot 5 to which a friction stir welding device M according to the present embodiment is attached, and FIG. 2 is a schematic side view showing a configuration of the friction stir welding device M. Although in FIG. 1, direction indications of "upper" and "lower" are attached, this is for convenience of description and is not intended to limit a use direction of the device.

The articulated robot 5 includes a robot arm 51 erected on a base. The robot arm 51 has a plurality of arm pieces and six joint shafts connecting the arm pieces. Specifically, the robot arm 51 can rotate around each of a first axis AX1, a second axis AX2, a third axis AX3, a fourth axis AX4, a fifth axis AX5, and a sixth axis AX6 illustrated in FIG. 1.

A gun 52 is attached to an arm distal end part 51T of the robot arm 51. The gun 52 can freely move three-dimensionally by rotation of the robot arm 51 around the first axis AX1 to the sixth axis AX6. The friction stir welding device M is assembled to the gun 52.

FIG. 1 has an enlarged view of the gun 52. The gun 52 includes a casing 53 and a C-shaped frame 54. The casing 53 accommodates a drive mechanism of the friction stir welding device M. The C-shaped frame 54 includes a proximal end part 541 positioned on the arm distal end part 51T side of the casing 53, and a distal end part 542 extending from the proximal end part 541 to below a tool 1 to be described later in the friction stir welding device M. The distal end part 542 holds a backing member 15 to be described later.

The friction stir welding device M according to the present disclosure may be attached to a device other than the articulated robot 5. For example, an embodiment can be adopted in which the friction stir device is attached to a mechanical device that only moves up and down along one axis.

[Mechanical Configuration of Friction Stir Welding Device]

A mechanical configuration of the friction stir welding device M will be described with reference to FIG. 2. The friction stir welding device M includes a welding tool 1, a tool driving unit 2 that drives the tool 1 to rotate and move up and down, and a tool fixing unit 55 that fixes the tool 1 to a workpiece. In the present embodiment, the workpiece is an overlapping part 30 formed by vertically overlapping a first member 31 and a second member 32 ultimately constitute a welded body 3.

The tool 1 includes a pin member 11, a shoulder member 12, a clamp member 13, and a spring 14.

The pin member 11 is a member formed in a columnar shape, and is arranged to have an axis Z extending in a vertical direction. Hereinafter, the axis Z is referred to as a tool axis Z. The pin member 11 can rotate around the tool axis Z and can move forward and backward in the vertical direction indicated by an arrow Z1 along the tool axis Z. In the present embodiment, the forward and backward movement is premised on that downward movement (lower) of the pin member 11 is forward movement, and upward movement (rise) of the pin member 11 is backward movement. The same applies to the shoulder member 12 and the clamp member 13.

The shoulder member 12 is arranged so as to cover an outer periphery of the pin member 11. The shoulder member 12 includes a hollow portion into which the pin member 11 is inserted, and is a member formed in a cylindrical shape. The shoulder member 12 has an axis coaxial with the tool axis Z. The shoulder member 12 can rotate around the tool axis Z similarly to the pin member 11, and can move forward and backward in the vertical direction indicated by an arrow Z2 along the tool axis Z. Both the shoulder member 12, and the pin member 11 inserted in the hollow portion can relatively move in a tool axis Z direction while rotating around the tool axis Z. Specifically, the pin member 11 and the shoulder member 12 can not only move up and down simultaneously along the tool axis Z, but also move independently such that one lowers and the other rises.

The clamp member 13 includes a hollow portion into which the shoulder member 12 is inserted, and is a member formed in a cylindrical shape. The clamp member 13 as well has an axis coaxial with the tool axis Z. Although the clamp member 13 does not rotate around the axis, the clamp member can move forward and backward in the vertical direction indicated by an arrow Z3 along the tool axis Z. When the pin member 11 or the shoulder member 12 performs friction stir welding, the clamp member 13 serves to surround an outer periphery of the member. The enclosure by the clamp member 13 prevents a friction stir material from scatter, so that a welded part can be finished smoothly.

The spring 14 is attached to an upper end part 131 of the clamp member 13 so as to extend upward. The spring 14 energizes the clamp member 13 downward, i.e., in a direction toward the overlapping part 30.

The tool fixing unit 55 includes a rotating tool fixture 551 and a clamp fixture 552. The rotating tool fixture 551 is arranged above the shoulder member 12 in which the pin member 11 is inserted, and supports the pin member 11 and the shoulder member 12. The clamp fixture 552 supports the clamp member 13 via the spring 14. The clamp fixture 552 also supports the rotating tool fixture 551 via a rotation driving unit 23 to be described later.

The backing member 15 is arranged to be opposed to a lower end surface which is a distal end of the tool 1. A support surface 151, which is an upper surface of the backing member 15, is formed as a flat surface for supporting a lower surface of a workpiece (overlapping part 30) to be welded. Specifically, the backing member 15 is a member that supports the overlapping part 30 when the pin member 11 or the shoulder member 12 is press-fitted into the overlapping part 30. The backing member 15 is held by the distal end part 542 of the C-shaped frame 54. The clamp member 13 energized by the spring 14 presses the overlapping part 30 against the backing member 15. The support surface 151 of the backing member 15 corresponds to a "contact surface" in the present disclosure.

As described above, a forward and backward movement axis of the pin member 11 and a forward and backward movement axis of the shoulder member 12 are both the tool axis Z. In addition, the pin member 11 and the shoulder member 12 rotate around the tool axis Z. In the present embodiment, since the robot arm 51 has the first axis AX1 to the sixth axis AX6, as shown in the enlarged view of the main part illustrated in FIG. 1, the forward and backward movement axis of the shoulder member 12 is treated as a seventh axis AX7, rotation axes of the pin member 11 and the shoulder member 12 are treated as an eighth axis AX8, and the forward and backward movement axis of the pin member 11 is treated as a ninth axis AX9.

The tool driving unit 2 includes a pin driving unit 21, a shoulder driving unit 22, and the rotation driving unit 23.

The pin driving unit 21 is a mechanism that causes the pin member 11 to move forward and backward (up and down) along the tool axis Z, in other words, is a drive mechanism for the ninth axis AX9. A distal end 11T, which is a lower end of the pin member 11, is driven by the pin driving unit 21 to lower (advance) toward the overlapping part 30 or to rise (retreat) with respect to the overlapping part 30. The pin driving unit 21 includes a servomotor 21a (FIG. 3) as a drive source, and a gear mechanism configured with a rack/pinion or the like that converts rotation of an output shaft of the servomotor 21a into linear movement (vertical movement) along the tool axis Z.

The shoulder driving unit 22 is a mechanism that causes the shoulder member 12 to move forward and backward (up and down) along the tool axis Z, in other words, is a drive mechanism for the seventh axis AX7. A distal end 12T, which is a lower end of the shoulder member 12, is driven by the shoulder driving unit 22 to lower (advance) toward the overlapping part 30 or to rise (retreat) with respect to the overlapping part 30. The shoulder driving unit 22 includes a servomotor 22a (FIG. 3) as a drive source, and a gear mechanism configured with a rack/pinion or the like that converts rotation of an output shaft of the servomotor 22a into linear movement (vertical movement) along the tool axis Z.

The shoulder driving unit 22 of the present embodiment is set to be a mechanism that causes the tool fixing unit 55 itself to move up and down, the tool fixing unit 55 supporting the pin member 11, the shoulder member 12, and the clamp member 13. Therefore, the movement of the pin member 11, the shoulder member 12, and the clamp member 13 in the directions indicated by the arrows Z1, Z2, and Z3 illustrated in FIG. 2 can be all realized by driving by the shoulder driving unit 22.

The pin member 11 can move forward and backward independently of the shoulder member 12 and the clamp member 13 by being driven by the pin driving unit 21. Specifically, the pin driving unit 21 is fixed to the inside of the shoulder member 12, and is a mechanism that causes the pin member 11 to relatively move up and down with reference to the fixing position. Thus, for example, even in a situation where the shoulder member 12 is lowered or stopped, the pin member 11 can be raised by the driving by the pin driving unit 21.

In a state where the clamp member 13 is lowered by the shoulder driving unit 22 to have a distal end (lower end) 13T thereof in contact with the overlapping part 30, an energizing force of the spring 14 acts on the clamp member 13. With this energizing force, the clamp member 13 presses the overlapping part 30 against the backing member 15 to fix a positional relationship between the overlapping part 30 and the tool 1.

The rotation driving unit 23 is a mechanism that causes the pin member 11 and the shoulder member 12 to rotate around the tool axis Z, in other words, a drive mechanism for the eighth axis AX8. The rotation driving unit 23 includes a servomotor 23a (FIG. 3) as a drive source, and a gear mechanism that shifts and transmits rotation of an output shaft of the servomotor 23a. The rotation driving unit 23 is held by the clamp fixture 552 and rotationally drives the rotating tool fixture 551. By this rotational drive, the pin member 11 and the shoulder member 12 supported by the rotating tool fixture 551 rotate around the tool axis Z.

[Electrical Configuration of Friction Stir Welding Device]

Figure 3:
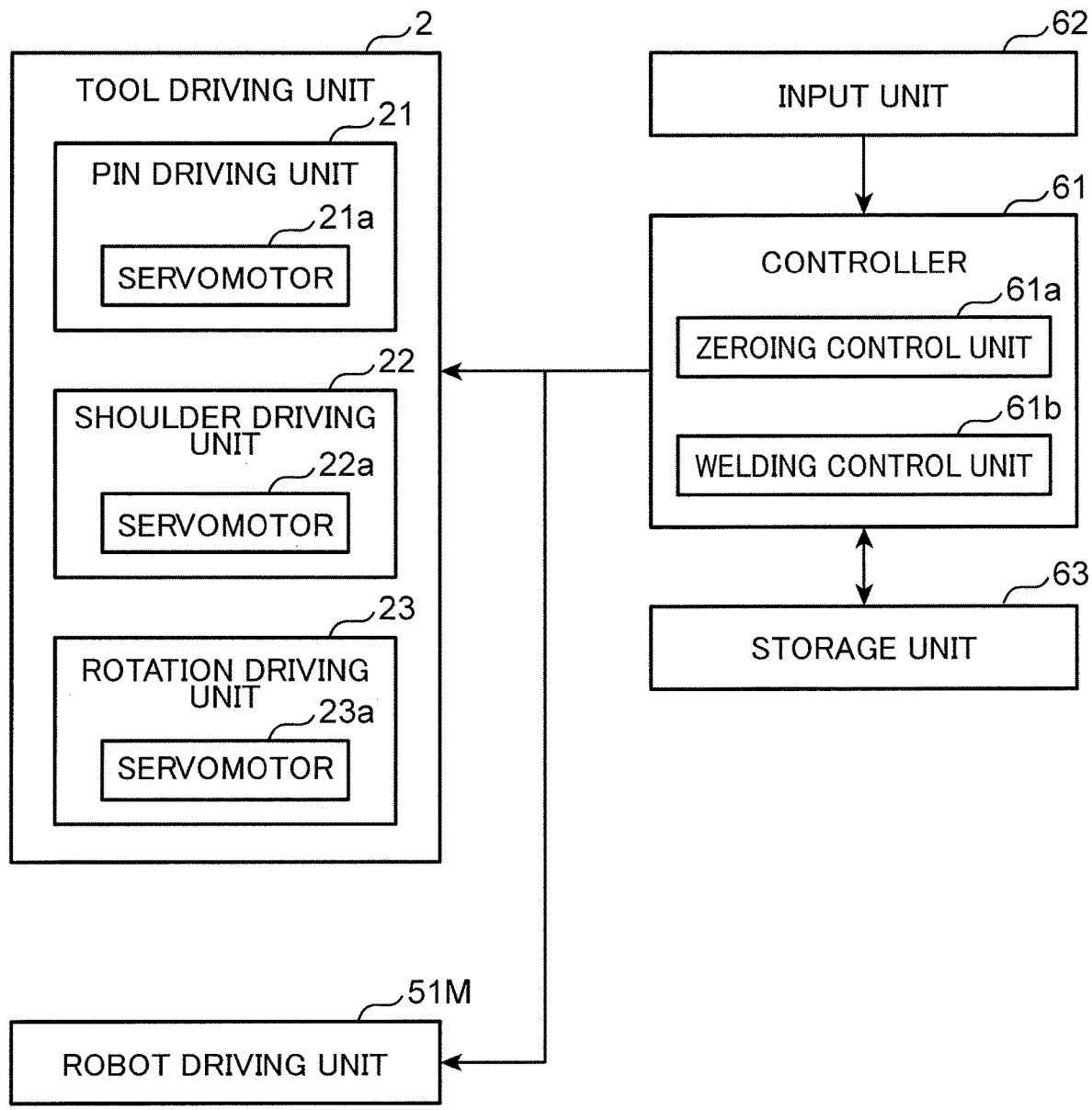
FIG. 3 is a block diagram showing an electrical configuration of the friction stir welding device.

FIG. 3 is a block diagram showing an electrical configuration of the friction stir welding device M. The friction stir welding device M includes, as functional elements thereof, a controller 61, an input unit 62, and a storage unit 63.

The controller 61, which is configured with a microcomputer or the like, controls operation of the tool driving unit 2 and the robot driving unit 51M by executing a predetermined control program. The robot driving unit 51M includes an actuator that drives the first axis AX1 to the sixth axis AX6 of the robot arm 51.

The control of the tool driving unit 2 by the controller 61 is performed in a manner as follows. Specifically, the controller 61 controls the servomotor 21a of the pin driving unit 21 to cause the pin member 11 to independently move forward and backward. The controller 61 also controls the servomotor 22a of the shoulder driving unit 22 to cause the pin member 11, the shoulder member 12, and the clamp member 13 to move forward and backward as required. Furthermore, the controller 61 controls the servomotor 23a of the rotation driving unit 23 to cause the pin member 11 and the shoulder member 12 to rotate around the tool axis Z.

The controller 61 also includes a zeroing control unit 61a and a welding control unit 61b. The welding control unit 61b is a control module for friction stir welding of the workpiece (overlapping part 30) using the pin member 11, the shoulder member 12, and the like. Specifically, the welding control unit 61b welds the workpiece (overlapping part 30) by press-fitting the pin member 11 and the shoulder member 12 into the workpiece while rotating the pin member and the shoulder member. The zeroing control unit 61a is a control module for automatically performing origin point alignment (zeroing) of the pin member 11 and the shoulder member 12. Details of the origin point alignment will be described later.

The input unit 62 is an interface for inputting various data and commands to the controller 61, and includes, for example, a keyboard, a touch panel, and the like.

The storage unit 63 stores various programs and data necessary for controlling the friction stir welding device M.

[Operation Example of Friction Stir Welding]

Friction stir welding using thus configured friction stir welding device M is roughly divided into welding by a pin preceding process and welding by a shoulder preceding process. The pin preceding process and the shoulder preceding process are different in whether the pin member 11 is press-fitted first or the shoulder member 12 is press-fitted first. An outline of each process is as follows.

Figure 4:
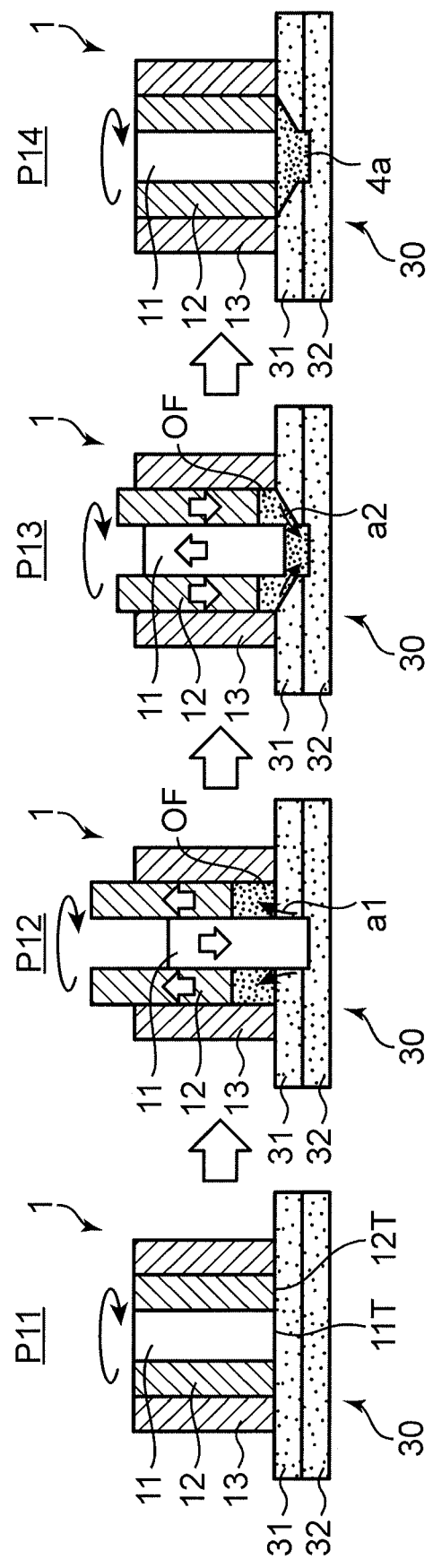
FIG. 4 is a schematic view showing a welding method by a pin preceding process as one operation example in a case of welding a workpiece using the friction stir welding device.

FIG. 4 is a schematic view for explaining a welding method by the pin preceding process. The welding method by the pin preceding process includes the following four Steps P11 to P14.

Step P11 is a preheating step for the overlapping part 30. In the preheating step, the pin member 11 and the shoulder member 12 are rotated at a high speed around the axis at a predetermined rotation rate in a state where the distal end (lower end) of the tool 1 is in contact with a surface of the first member 31. Due to frictional heat caused by the high speed rotation, a material of a part in contact with each of the distal ends 11T and 12T of the pin member 11 and the shoulder member 12 softens, and a plastic flow portion is generated in the vicinity of an upper surface of the overlapping part 30.

Step P12 is a step of press-fitting the pin member 11. In the press-fitting step, as indicated by a white arrow in the figure, the pin member 11 is lowered and press-fitted into the overlapping part 30, while the shoulder member 12 is raised. By this operation, the softened material overflows from a region into which the pin member 11 is press-fit. As indicated by an arrow a1, an overflowed material OF is released to an annular region generated between the pin member 11 and the clamp member 13 by the rise (retreat) of the shoulder member 12.

Step P13 is a backfilling step of the overflowed material OF. In the backfilling step, the pin member 11 is raised while the shoulder member 12 is lowered. As the shoulder member 12 is lowered, the overflowed material OF released to the annular region is backfilled in the region into which the pin member 11 is press-fit as indicated by an arrow a2.

Step P14 is a leveling step. In the leveling step, both the distal ends 11T and 12T of the pin member 11 and the clamp member 13 are rotated while being returned to a height position of the surface of the first member 31. As a result, the upper surface of the overlapping part 30 is shaped and smoothed to such an extent that unevenness is hardly formed.

Through the foregoing Steps P11 to P14, a welded part 4a having a smooth upper surface is formed, and the first member 31 and the second member 32 are point-welded in the overlapping part 30.

Figure 5:
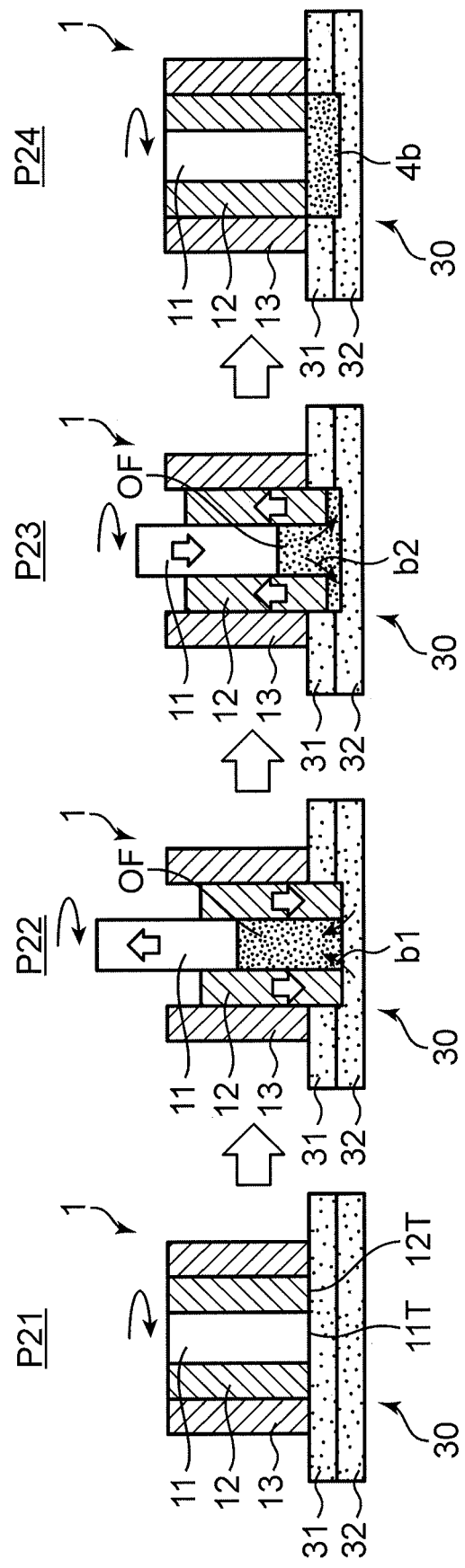
FIG. 5 is a schematic view showing a welding method by a shoulder preceding process as another operation example in the case of welding a workpiece using the friction stir welding device.

FIG. 5 is a schematic view for explaining a welding method by the shoulder preceding process. The welding method by the shoulder preceding process includes the following four Steps P21 to P24.

Step P21 is a preheating step for the overlapping part 30, similar to Step P11 described above. In this preheating step, a material of a part in contact with each of the distal ends 11T and 12T of the pin member 11 and the shoulder member 12 which are rotating at a high speed softens, and a plastic flow portion is generated in the vicinity of the upper surface of the overlapping part 30.

Step P22 is a step of press-fitting the shoulder member 12. In the press-fitting step, the shoulder member 12 is lowered and press-fitted into the overlapping part 30, while the pin member 11 is raised. By this operation, the softened material overflows from a region into which the shoulder member 12 is press-fit. As indicated by an arrow b1, the overflowed material OF is released to a hollow space of the shoulder member 12 generated by the rise (retreat) of the pin member 11.

Step P23 is a backfilling step of the overflowed material OF. In the backfilling step, the shoulder member 12 is raised while the pin member 11 is lowered. As the pin member 11 is lowered, the overflowed material OF released to the hollow space is backfilled in the region into which the shoulder member 12 is press-fit as indicated by an arrow b2.

Step P24 is a leveling step similar to Step P14 described above. As a result of the leveling step, the upper surface of the overlapping part 30 is shaped and smoothed to such an extent that unevenness is hardly formed.

Through the foregoing processes, a welded part 4b having a smooth upper surface is formed, and the first member 31 and the second member 32 are point-welded in the overlapping part 30.

[Operation Example of Zeroing]

As described above, the smooth welded part (4a or 4b) can be formed in the overlapping part 30 using either the welding method by the pin preceding process or the welding method by the shoulder preceding process. In order to ensure smoothness of the welded part, in the leveling step in particular, it is necessary to adjust the distal end 11T of the pin member 11 and the distal end 12T of the shoulder member 12 at the same height by aligning them with sufficient accuracy. In order to ensure such alignment accuracy, it is required to perform, with sufficient accuracy, origin point alignment (zeroing) of setting the origin points of both the pin member 11 and the shoulder member 12 in a state where the heights of the distal ends 11T and 12T of the members 11 and 12 are matched with each other before welding. Here, origin points of the pin member 11 and the shoulder member 12 represent origin points of a Z-axis coordinate which is assumed to be a coordinate along the tool axis Z as the forward and backward movement axis for both the members 11 and 12. In other words, the origin point alignment (zeroing) referred to herein is operation of matching the origin point of the Z-axis coordinate of the pin member 11 with the origin point of the Z-axis coordinate of the shoulder member 12.

Figure 6:
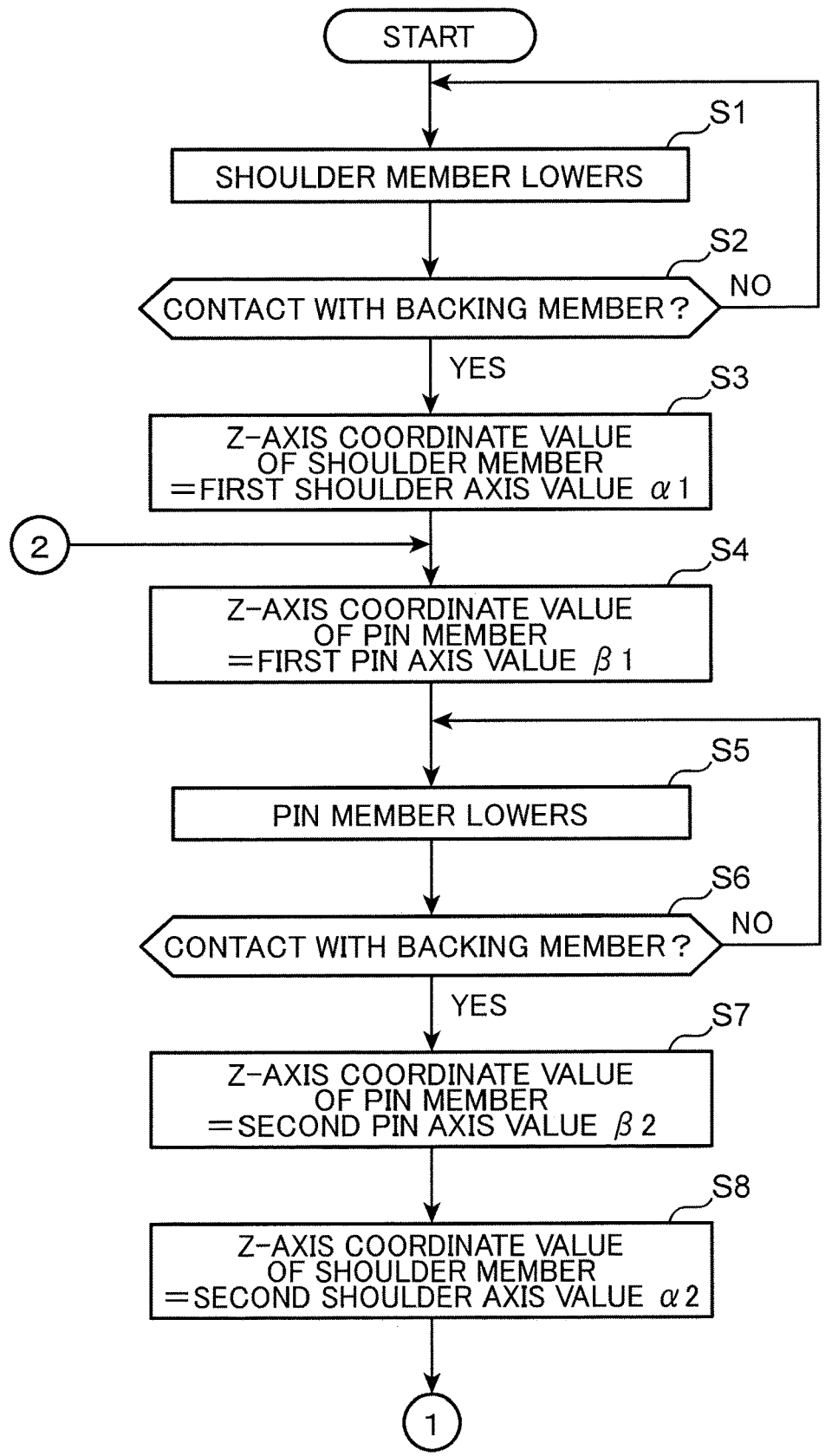
FIG. 6 is a flowchart showing a first half of zeroing control executed by a controller for origin point alignment of a pin member and a shoulder member in the friction stir welding device.
Figure 7:
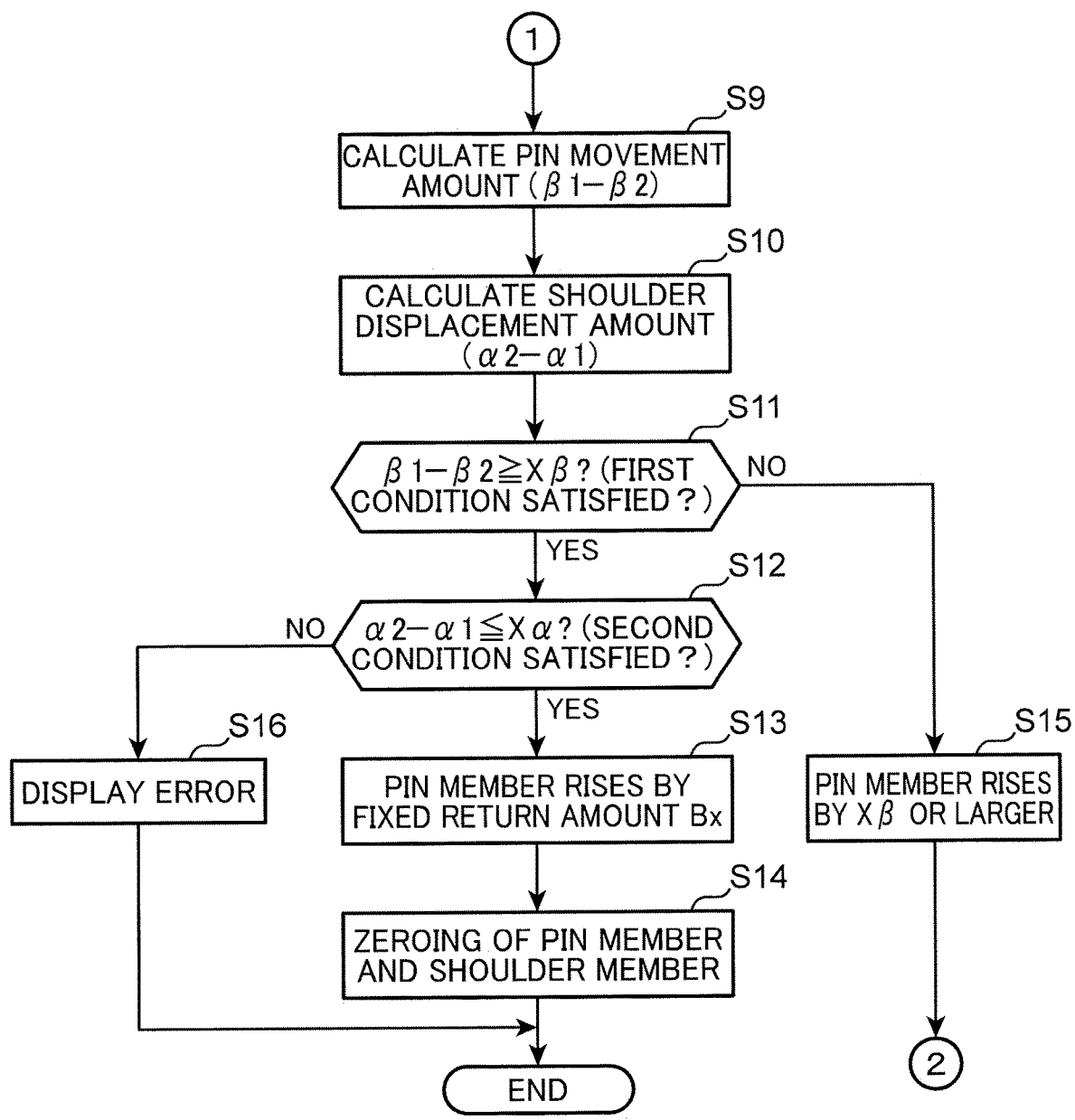
FIG. 7 is a flowchart showing a second half of the zeroing control.

FIGS. 6 and 7 are flowcharts showing a specific procedure of control executed by the controller 61 at the time of zeroing, i.e., zeroing control. The zeroing control is executed after assembly of the friction stir welding device M is completed and before the friction stir welding device M is shipped to a user. In addition, the zeroing control is control executed according to a program stored in advance in the storage unit 63, and is started in response to input of a zeroing command to the controller 61 by an operator via the input unit 62, the zeroing command being a command to start the program.

When the control shown in FIG. 6 is started in response to the input of the zeroing command, the zeroing control unit 61a of the controller 61 causes the shoulder member 12 to lower toward the backing member 15 (Step S1). Specifically, the zeroing control unit 61a rotatably drives the servomotor 22a of the shoulder driving unit 22 in a direction in which the shoulder member 12 lowers, thereby causing the shoulder member 12 to lower (advance) until the distal end 12T of the shoulder member 12 comes into contact with the support surface 151 of the backing member 15.

However, at the time point when the lowering of the shoulder member 12 is started in Step S1, an origin point of the Z-axis coordinate of the shoulder member 12 is unknown, and only a temporary origin point exists. Specifically, a position of the shoulder member 12 on the Z-axis coordinate is recognized on the basis of an output from an encoder (a position detection unit) provided in the servomotor 22a, and the origin point of the Z-axis coordinate at this time is a temporary origin point set by default at the time of assembling the friction stir welding device M. Therefore, a distance from the distal end 12T of the shoulder member 12 at an initial position to the support surface 151 of the backing member 15 is unknown for the zeroing control unit 61a. Therefore, the zeroing control unit 61a sets a virtual target value of the Z-axis coordinate such that the distal end 12T of the shoulder member 12 without fail comes into contact with the support surface 151 of the backing member 15 on the basis of a value of the Z-axis coordinate immediately before driving the servomotor 22a, i.e., an initial value of the Z-axis coordinate, and controls the servomotor 22a such that the shoulder member 12 lowers to the virtual target value. Here, it is assumed that a positive direction of the Z-axis coordinate is an upward direction. In this case, the virtual target value of the Z-axis coordinate can be, for example, a value obtained by subtracting a value equal to or larger than a maximum move forward and backward amount of the shoulder member 12 from the initial value of the Z-axis coordinate. The maximum move forward and backward amount of the shoulder member 12 is a movement amount in the Z-axis direction of the shoulder member 12 which has been moved from an upper limit of a forward and backward movable range to the support surface 151 of the backing member 15. The upper limit of the forward and backward movable range of the shoulder member 12 can be set to, for example, a position where the shoulder member 12 comes into contact with an upper side mechanical stopper.

Next, the zeroing control unit 61a determines whether or not the distal end 12T of the shoulder member 12 contacts the support surface 151 of the backing member 15 (Step S2). For example, the zeroing control unit 61a determines the contact of the shoulder member 12 on the basis of an operating current of the servomotor 22a. Specifically, when the shoulder member 12 comes into contact with the backing member 15, a load of the servomotor 22a increases, and as a result, the operating current of the servomotor 22a increases. Therefore, when it is confirmed that the operating current has increased to a predetermined value, the zeroing control unit 61a determines that the shoulder member 12 contacts the backing member 15. Here, in the friction stir welding device M of the present embodiment, the shoulder member 12 functions as a pressurizing shaft, and a control logic for determining a pressurizing force from the operating current of the servomotor 22a is mounted on the controller 61. The determination in Step S2 can be made without any trouble using such a control logic.

Figure 8A:
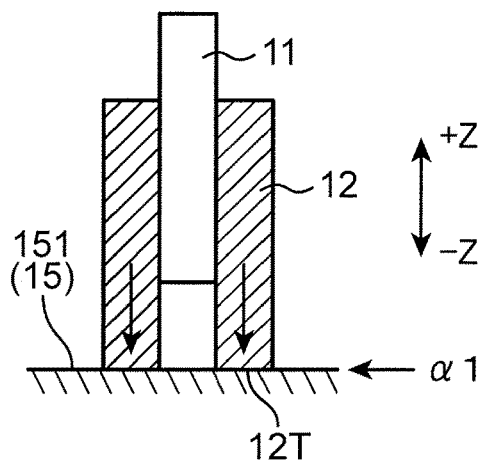
FIG. 8A is a schematic view showing states of the pin member and the shoulder member in a first stage of the zeroing control.

When the determination of YES is made in Step S2 to confirm that the shoulder member 12 has contacted the backing member 15, the zeroing control unit 61a causes the storage unit 63 to store, as a first shoulder axis value $\alpha 1$, the value of the Z-axis coordinate of the shoulder member 12 at this time (Step S3). FIG. 8A shows a state in which the distal end 12T of the shoulder member 12 is in contact with the support surface 151 of the backing member 15. The zeroing control unit 61a causes the storage unit 63 to store the value of the Z-axis coordinate of the shoulder member 12 in such a contact state as the first shoulder axis value $\alpha 1$. The first shoulder axis value $\alpha 1$ corresponds to a "first shoulder position" in the present disclosure.

Figure 8B:
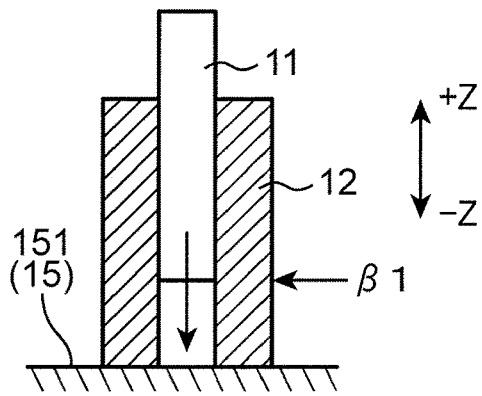
FIG. 8B is a schematic view showing states of the pin member and the shoulder member in a second stage of the zeroing control.

Next, as illustrated in FIG. 8B, the zeroing control unit 61a causes the storage unit 63 to store a current value of the Z-axis coordinate of the pin member 11 as a first pin axis value $\beta 1$ (Step S4). Since the pin member 11 neither rises nor lowers at the time of Step S4, the first pin axis value $\beta 1$ can be regarded as an initial value of the Z-axis coordinate of the pin member 11. The first pin axis value $\beta 1$ corresponds to a "first pin position" in the present disclosure.

Next, the zeroing control unit 61a causes the pin member 11 to lower toward the backing member 15 (Step S5). Specifically, the zeroing control unit 61a rotatably drives the servomotor 21a of the pin driving unit 21 in a direction in which the pin member 11 lowers, thereby causing the pin member 11 to lower (advance) until the distal end 11T of the pin member 11 comes into contact with the support surface 151 of the backing member 15.

However, at the time point when the lowering of the pin member 11 is started in Step S5, an origin point of the Z-axis coordinate of the pin member 11 is unknown, and only a temporary origin point exists. Specifically, a position of the pin member 11 on the Z-axis coordinate is recognized on the basis of an output from an encoder (a position detection unit) provided in the servomotor 21a, and the origin point of the Z-axis coordinate at this time is a temporary origin point set by default at the time of assembling the friction stir welding device M. Therefore, similarly to the above Step S1 of lowering the shoulder member 12, the zeroing control unit 61a sets a virtual target value of the Z-axis coordinate such that the distal end 11T of the pin member 11 without fail comes into contact with the support surface 151 of the backing member 15 on the basis of a value of the Z-axis coordinate immediately before driving the servomotor 21a, i.e., on the basis of an initial value of the Z-axis coordinate, and controls the servomotor 21a such that the pin member 11 lowers to the virtual target value. In this case, the virtual target value of the Z-axis coordinate can be, for example, a value obtained by subtracting a value equal to or larger than a maximum move forward and backward amount of the pin member 11 from the initial value of the Z-axis coordinate.

Figure 9:
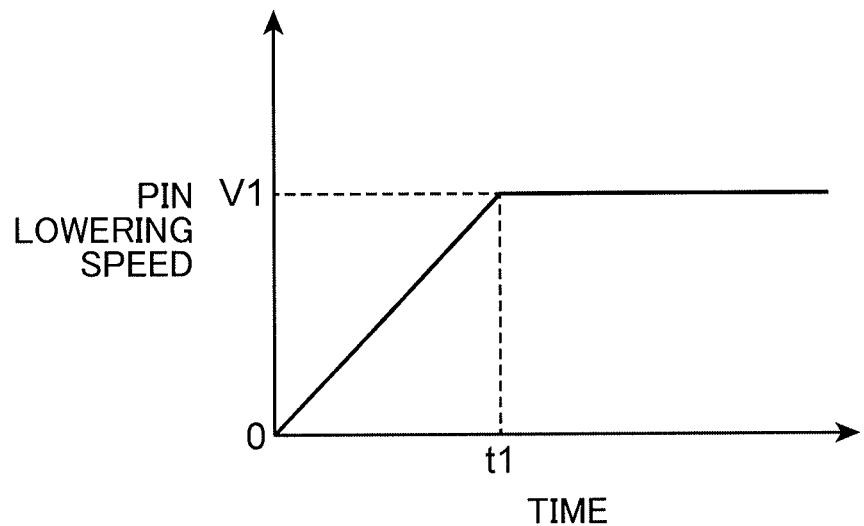
FIG. 9 is a graph showing a speed pattern when the pin member is lowered in Step S5 of FIG. 6.

As illustrated in FIG. 9, in Step S5, the zeroing control unit 61a controls the servomotor 21a so that a pin lowering speed, which is a lowering speed of the pin member 11, changes in a predetermined speed pattern. Specifically, the zeroing control unit 61a causes the pin member 11 to accelerate at the same time as the start of Step S5, and causes the pin lowering speed to increase toward a predetermined target speed V1. Then, after a time point t1 when the pin lowering speed reaches the target speed V1, the zeroing control unit 61a causes the pin member 11 to move at a constant speed so that the pin lowering speed becomes constant at the target speed V1. The target speed V1 is set to a value sufficiently lower than an upper limit value of the pin lowering speed (e.g., several mm/s).

Next, the zeroing control unit 61a determines whether or not the distal end 11T of the pin member 11 contacts the support surface 151 of the backing member 15 (Step S6). For example, the zeroing control unit 61a examines a temporal change of a deviation between the virtual target value set in Step S5 and a Z-axis coordinate of the current pin member 11 on the basis of an output value from the encoder of the servomotor 21a, and determines that the pin member 11 has contacted the backing member 15 when it is confirmed that the deviation does not substantially change over a predetermined period. Thus, the contact determination of the pin member 11 is not determination based on a motor current but determination based on a coordinate position deviation, which is different from the contact determination (Step S2) of the shoulder member 12 described above. This is due to a difference in a control logic between the pin member 11 and the shoulder member 12. Specifically, in the friction stir welding device M of the present embodiment, the pin member 11 functions as a linear motion shaft, and a control logic for determining a pressurizing force from a motor current is not applied to the pin member 11 unlike the case of the shoulder member 12 which is the pressurizing shaft. Therefore, in Step S6, contact of the pin member 11 is determined on the basis of not the motor current but the coordinate position deviation.

Figure 8C:
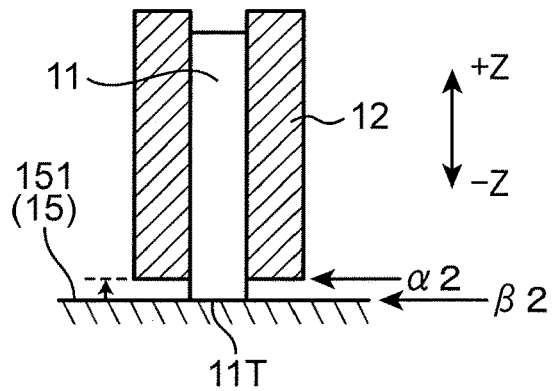
FIG. 8C is a schematic view showing states of the pin member and the shoulder member in a third stage of the zeroing control.

When the determination of YES is made in Step S6 to confirm that the pin member 11 has contacted the backing member 15, the zeroing control unit 61a causes the storage unit 63 to store, as a second pin axis value β2, a value of the Z-axis coordinate of the pin member 11 at this time (Step S7). FIG. 8C shows a state in which the distal end 11T of the pin member 11 is in contact with the support surface 151 of the backing member 15. The zeroing control unit 61a causes the storage unit 63 to store the value of the Z-axis coordinate of the pin member 11 in such a contact state as the second pin axis value β2. The second pin axis value β2 corresponds to a "second pin position" in the present disclosure.

Next, as illustrated in FIG. 8C, the zeroing control unit 61a causes the storage unit 63 to store a current value of the Z-axis coordinate of the shoulder member 12 as a second shoulder axis value α2 (Step S8). In other words, it is known that when the pin member 11 comes into contact with the backing member 15 as described above, a phenomenon occurs in which the shoulder member 12 is slightly displaced upward (lifts) due to an influence of the contact. Therefore, in Step S8, in order to confirm a position of the shoulder member 12 after the upward displacement, the current value of the Z-axis coordinate of the shoulder member 12 is checked. The second shoulder axis value α2 corresponds to a "second shoulder position" in the present disclosure.

Here, such upward displacement of the shoulder member 12 as described above is considered to be a phenomenon caused by the structure of the friction stir welding device M of the present embodiment in which the pin member 11 is moved up and down relative to the shoulder member 12 by the pin driving unit 21 fixed inside the shoulder member 12. For example, when the pin member 11 comes into contact with the backing member 15 and presses the backing member 15, it is considered that a reaction force of the pressing acts on the shoulder member 12 via the gear mechanism such as a rack/pinion in the pin driving unit 21 to result in displacing the shoulder member 12 slightly upward. An amount of displacement of the shoulder member 12 at this time, which is minute displacement, is exaggerated in FIG. 8C.

Next, the zeroing control unit 61a calculates a pin movement amount (β1−β2) on the basis of the first pin axis value β1 acquired in Step S4 and the second pin axis value β2 acquired in Step S7 (Step S9 in FIG. 7). Specifically, by subtracting the second pin axis value β2 representing the position of the pin member 11 when the pin member comes into contact with the backing member 15 from the first pin axis value β1 representing an initial position of the pin member 11, the zeroing control unit 61a calculates the pin movement amount (β1−β2) which is a distance from the initial position of the pin member 11 to the backing member 15.

Next, the zeroing control unit 61a calculates a shoulder displacement amount (α2−α1) on the basis of the first shoulder axis value α1 acquired in Step S3 and the second shoulder axis value α2 acquired in Step S8 (Step S10). Specifically, by subtracting the first shoulder axis value α1 representing the position of the shoulder member 12 when the shoulder member comes into contact with the backing member 15 from the second shoulder axis value α2 representing the position of the shoulder member 12 displaced upward (retreat displacement) in response to the contact of the pin member 11 with the backing member 15, the zeroing control unit 61a calculates the shoulder displacement amount (α2−α1) which is an upward displacement amount of the shoulder member 12 from the backing member 15.

Next, the zeroing control unit 61a determines whether or not a first condition is satisfied that the pin movement amount (β1−β2) calculated in Step S9 is equal to or larger than a predetermined reference movement amount Xβ (Step S11). The reference movement amount Xβ used here is set to be equal to or larger than a distance necessary to increase the lowering speed of the pin member 11 to the target speed V1 when the pin member 11 is lowered along the speed pattern illustrated in FIG. 9. In other words, when the pin movement amount (β1−β2) is equal to or larger than the reference movement amount Xβ, the pin member 11 immediately before coming into contact with the backing member 15 has made constant movement at the target speed V1. Conversely, when the pin movement amount (β1−β2) is less than the reference movement amount Xβ, there is a possibility that the lowering speed of the pin member 11 at the time of contacting the backing member 15 has not reached the target speed V1, i.e., there is a possibility that the pin member 11 is still in the middle of acceleration.

When determination of YES is made in Step S11 to confirm that the first condition is satisfied, i.e., when $\beta1-\beta2 \geq X\beta$ is established, the zeroing control unit 61a determines whether or not a second condition is satisfied that the shoulder displacement amount ($\alpha2-\alpha1$) calculated in Step S10 is equal to or smaller than a predetermined reference displacement amount $X\alpha$ (Step S12). The reference displacement amount $X\alpha$ used here corresponds to a maximum value of the upward displacement amount of the shoulder member 12 that can be normally generated when the pin member 11 comes into contact with the backing member 15 at the target speed V1 illustrated in FIG. 9, and can be experimentally determined.

The zeroing control unit 61a executes three different types of control depending on results of the respective determinations in Steps S11 and S12, in other words, depending on whether the first condition is satisfied or not and whether the second condition is satisfied or not. First, description will be made of control conducted in a case where determination of YES is made in Step S12, i.e., where it is confirmed that the second condition is satisfied.

Figure 10:
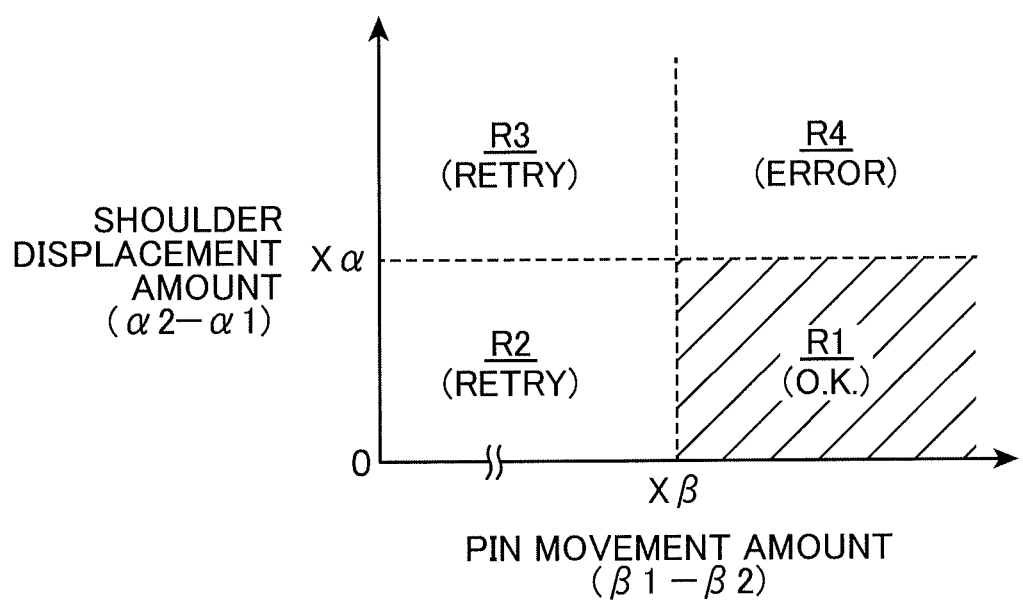
FIG. 10 is a diagram showing a condition map using a pin movement amount and a shoulder displacement amount as parameters.

That satisfaction of the second condition is confirmed in Step S12 means that both the first condition and the second condition are satisfied, i.e., $\beta1-\beta2 \geq X\beta$ and $\alpha2-\alpha1 \leq X\alpha$ are established. In other words, as illustrated in FIG. 10, it means that a condition corresponding to a lower right first region R1 is satisfied on a condition map in which the pin movement amount ($\beta1-\beta2$) is represented on a horizontal axis and the shoulder displacement amount ($\alpha2-\alpha1$) is represented on a vertical axis. In this case, the zeroing control unit 61a causes the pin member 11 to rise by a fixed return amount Bx (Step S13). The fixed return amount Bx is a predetermined constant value, and is a value experimentally obtained in order to match a height of the distal end 11T of the pin member 11 with a height of the distal end 12T of the shoulder member 12. As a result of the rise of the pin member 11 by such fixed return amount Bx, the distal end 11T of the pin member 11 and the distal end 12T of the shoulder member 12 are adjusted to be flush with each other as illustrated in FIG. 8D.

Here, although the fixed return amount Bx that is a constant value does not necessarily coincide with the shoulder displacement amount ($\alpha2-\alpha1$) that is an amount of lift of the shoulder member 12 from the backing member 15, a deviation (positional deviation) in the height of each of the distal ends 11T and 12T of the pin member 11 and the shoulder member 12 in the state shown in FIG. 8C is more likely to coincide with the fixed return amount Bx rather than with the shoulder displacement amount ($\alpha2-\alpha1$). In other words, according to the knowledge of the inventors of the present application, the shoulder displacement amount ($\alpha2-\alpha1$) specified by the encoder does not exactly coincide with actual height deviations of the distal ends 11T and 12T of the pin member 11 and the shoulder member 12. This is considered to be caused by an error derived from distortion or the like of the members. Therefore, even if the pin member 11 is raised by the same amount as the shoulder displacement amount ($\alpha2-\alpha1$) from the state shown FIG. 8C, the heights of the distal ends 11T and 12T of the pin member 11 and the shoulder member 12 do not always coincide with each other. Rather, it has been found that in a situation where both the first condition and the second condition are satisfied, the height deviations of the distal ends 11T and 12T take substantially the same value, and a certain fixed return amount Bx experimentally obtained on the basis of such finding is predetermined in a program for the zeroing control. In the above Step S13, as a result of the rise of the pin member 11 by thus determined fixed return amount Bx, the distal ends 11T and 12T of the pin member 11 and the shoulder member 12 are adjusted to be flush with each other as illustrated in FIG. 8D.

Next, the zeroing control unit 61a performs origin point alignment, i.e., zeroing, of the Z-axis coordinate of the pin member 11 and the shoulder member 12 (Step S14). Specifically, after the execution of Step S13 of raising the pin member 11 by the fixed return amount Bx, the zeroing control unit 61a performs origin point alignment of the pin member 11 and the shoulder member 12 on the basis of the respective positions of the pin member 11 and the shoulder member 12 at this time. More specifically, in the state of FIG. 8D after the execution of Step S13, the zeroing control unit 61a resets each origin point of the pin member 11 and the shoulder member 12 so that a Z-axis coordinate value of the pin member 11 specified from an encoder output value of the servomotor 21a and a Z-axis coordinate value of the shoulder member 12 specified from an encoder output value of the servomotor 22a coincide with each other.

Figure 8D:
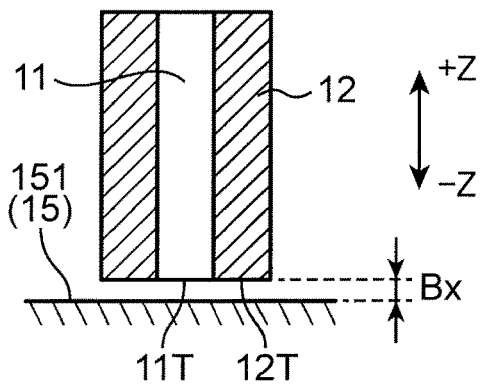
FIG. 8D is a schematic view showing states of the pin member and the shoulder member in a fourth stage of the zeroing control.

For example, the zeroing control unit 61a corrects each of a relationship between the encoder output value of the servomotor 21a and the Z-axis coordinate value and a relationship between the encoder output value of the servomotor 22a and the Z-axis coordinate value, and resets each origin point of the pin member 11 and the shoulder member 12, thereby matching the Z-axis coordinate value of the pin member 11 and the Z-axis coordinate value of the shoulder member 12 in the above-described state shown in FIG. 8D. Each origin point of the pin member 11 and the shoulder member 12 after the reset can be set at an appropriate position as long as the Z-axis coordinate values coincide with each other in the state shown in FIG. 8D. For example, when the pin member 11 and the shoulder member 12 are in the state shown in FIG. 8D, the origin points may be reset such that the Z-axis coordinate values of both the members 11 and 12 become a value (0) representing the origin point, or when the pin member and the shoulder member are similarly in the state shown in FIG. 8D, the origin points may be reset such that the Z-axis coordinate values of both the members 11 and 12 become a minute positive value corresponding to the fixed return amount Bx. In the latter case, it is expected that each Z-axis coordinate value of the pin member 11 and the shoulder member 12 becomes 0 in a state where the pin member 11 and the shoulder member 12 are in contact with the backing member 15.

Next, description will be made of control conducted in a case where determination of NO is made in Step S11 to confirm that the first condition is not satisfied. That the first condition is confirmed not to be satisfied in Step S11 means that both the first condition and the second condition are not satisfied, or that the first condition is not satisfied and the second condition is satisfied. The former means that $\beta1-\beta2 < X\beta$ and $\alpha2-\alpha1 > X\alpha$, and the latter means that $\beta1-\beta2 < X\beta3$ and $\alpha2-\alpha1 \leq X\alpha$. Specifically, that determination of NO is made in the above Step S11 means that on the condition map as illustrated in FIG. 10 in which the pin movement amount ($\beta1-\beta2$) is represented on the horizontal axis and the shoulder displacement amount ($\alpha2-\alpha1$) is represented on the vertical axis, a condition corresponding to a second region R2 shown on the lower left or a third region R3 shown on the upper left is satisfied. In this case, the zeroing control unit 61a causes the pin member 11 to rise by a distance equal to or larger than the reference movement amount $X\beta$ (Step S15).

Immediately before the execution of Step S15, the pin member 11 is in the state of being in contact with the backing member 15 as illustrated in FIG. 8C. Therefore, the pin member 11 rises from the backing member 15 by the distance equal to or larger than the reference movement amount Xβ by the execution of Step S15. Hereinafter, the position of the pin member 11 when the rise is completed is referred to as a restart position. The restart position may be set at a position away from the backing member (support surface 151) by the same distance as the reference movement amount Xβ, or may be set at a position away from the backing member 15 by a distance exceeding the reference movement amount Xβ to some extent with a margin. Alternatively, an upper limit of a forward and backward movable range of the pin member 11, i.e., a position where the pin member 11 comes into contact with the mechanical stopper may be set as the restart position.

After Step S15, the flow is returned to Step S4. In Step S4 in this case, the zeroing control unit 61a causes the storage unit 63 to store the Z-axis coordinate value of the pin member 11 after being raised to the restart position by the control of Step S15 as a new first pin axis value β1. Specifically, the zeroing control unit 61a rewrites the first pin axis value β1 stored in the storage unit 63 to the Z-axis coordinate value obtained when the pin member 11 is raised to the restart position from the value α1 ready stored in the previous Step S4.

Thereafter, the control after Step S5 is similarly repeated. Specifically, the zeroing control unit 61a causes the pin member 11 raised to the restart position to lower until coming into contact with the backing member 15 (Steps S5 and S6), and causes the Z-axis coordinate values of the pin member 11 and the shoulder member 12 at that time to be stored as a new second pin axis value β2 and a new second shoulder axis value α2, respectively (Steps S7 and S8). Then, whether the first condition is satisfied or not and whether the second condition is satisfied or not are determined on the basis of the pin movement amount (β1−β2) and the shoulder displacement amount (α2−α1) calculated using the respective axis values (Steps S9 to S12), and appropriate control according to the determination result is executed (Steps S13 to S16).

Next, description will be made of control conducted in a case where determination of NO is made in Step S12 to confirm that the second condition is not satisfied. That the second condition is confirmed not to be satisfied in Step S12 means that the first condition is satisfied and the second condition is not satisfied, i.e., β1−β2≥Xβ and α2−α1>Xα are established. Specifically, it means that a condition corresponding to a fourth region R4 on the upper right is satisfied on the condition map shown in FIG. 10 in which the pin movement amount (β1−β2) is represented on the horizontal axis and the shoulder displacement amount (α2−α1) is represented on the vertical axis. In this case, the zeroing control unit 61a displays a predetermined error message (Step S16). For example, the zeroing control unit 61a causes a display device (not illustrated) configured with a liquid crystal panel or the like to display a predetermined error message indicating a possibility that an abnormality exists in the friction stir welding device M.

In other words, according to the knowledge of the inventors of the present application, when the first condition regarding the pin movement amount (β1−β2) is satisfied, the second condition regarding the shoulder displacement amount (α2−α1) is also satisfied with a high probability. Conversely, a situation in which the second condition is not satisfied even though the first condition is satisfied is a situation that is not ordinarily assumed, in which some abnormality might be occurring in the friction stir welding device M. Therefore, in Step S16, an error message is displayed to notify the operator of that effect.

In the foregoing zeroing control, Step S3 in FIG. 6 corresponds to "first step" or "first processing" in the present disclosure, Step S4 in FIG. 6 corresponds to "second step" or "second processing" in the present disclosure, Steps S5 to S7 in FIG. 6 correspond to "third step" or "third processing" in the present disclosure, Step S8 in FIG. 6 corresponds to "fourth step" or "fourth processing" in the present disclosure, Steps S11 and S12 in FIG. 7 correspond to "fifth step" or "fifth processing" in the present disclosure, Steps S13 and S14 in FIG. 7 correspond to "sixth step" or "sixth processing" in the present disclosure, and Step S15 in FIG. 7 corresponds to "seventh step" or "seventh processing" in the present disclosure.

[Operation and Effect]

As described in the foregoing, in the present embodiment, origin point alignment of the pin member 11 and the shoulder member 12 in the friction stir welding device M is performed in the following procedure.

In a state where the shoulder member 12 is in contact with the backing member 15, the pin member 11 is additionally brought into contact with the backing member 15 to examine the pin movement amount (β1−β2), which is the distance from the initial position of the pin member 11 to the backing member 15, and the shoulder displacement amount (α2−α1), which is the displacement amount when the shoulder member 12 is slightly displaced upward as the pin member 11 comes into contact.

It is determined whether or not the first condition is satisfied that the pin movement amount (β1−β2) is equal to or larger than the reference movement amount XP and whether or not the second condition is satisfied that the shoulder displacement amount (α2−α1) is equal to or smaller than the reference displacement amount Xα.

When both the first condition and the second condition are satisfied, the pin member 11 is raised from the backing member 15 by the fixed return amount Bx, and origin point alignment of both the members 11 and 12 is performed on the basis of the positions of the pin member 11 and the shoulder member 12 in that state.

When the first condition is not satisfied, the pin member 11 is raised by a distance equal to or larger than the reference movement amount XP, and the same procedure is repeated from the restart position after the rise.

The present embodiment in which the origin point alignment is performed by such a method has an advantage that efficiency and safety of the origin point alignment can be enhanced while securing accuracy of the origin point alignment.

As is already described, it is known that when the pin member 11 is additionally brought into contact with the backing member 15 in a state where the shoulder member 12 is in contact with the backing member 15, the shoulder member 12 slightly rises (retreats) as the pin member 11 comes into contact with the backing member, and it is additionally known that the height deviations (see FIG. 8C) of the distal ends 11T and 12T of the pin member 11 and the shoulder member 12 caused by the upward displacement are uniquely determined in a situation where both the first condition and the second condition are satisfied. In the present embodiment, when satisfaction of both the first condition and the second condition is confirmed, the pin member is driven to rise by the fixed return amount Bx, so that the height of the distal end 11T of the pin member 11 after the rise can be accurately matched with the height of the distal end 12T of the shoulder member 12. Then, by performing origin point alignment of the pin member 11 and the shoulder member 12 in this state, the accuracy of the origin point alignment can be enhanced, and welding performance of the friction stir welding device M including the pin member 11 and the shoulder member 12 can be improved. For example, at the time of welding the overlapping part 30 between the first member 31 and the second member 32, it is possible to improve performance of finishing an upper surface of the welded part to be smooth.

Moreover, just by performing operation of sequentially bringing the shoulder member 12 and the pin member 11 into contact with the same backing member 15 to specify positions of the shoulder member 12 and the pin member 11 at each stage as the first and second shoulder axis values α1 and α2 and the first and second pin axis values P1 and P2, respectively, it is possible to determine whether the first condition is satisfied or not and whether the second condition is satisfied or not from the specified positions. In addition, when both the conditions are satisfied, the heights of the pin member 11 and the shoulder member 12 can be matched only by raising the pin member 11 by the fixed return amount Bx. Therefore, origin point alignment can be easily performed while automating a series of the procedures, resulting in enhancing efficiency and safety of the origin point alignment.

On the other hand, when at least the first condition is not satisfied, the pin member 11 rises to the restart position farther away from the backing member 15, and the same procedure is repeated at the position. Therefore, a situation in which the heights of the pin member 11 and the shoulder member 12 coincide with each other can be realized as much as possible, and a probability that the origin point alignment is automatically performed can be increased.

In the above embodiment, the reference movement amount Xβ which is a determination threshold of the first condition is set to be equal to or larger than a distance in which the pin member 11 is guaranteed to contact the backing member 15 at the constant target speed V1, i.e., a distance necessary for accelerating the pin member 11 to the target speed V1. Therefore, the height deviation when the first condition and the second condition are satisfied, i.e., a difference in height between the distal ends 11T and 12T in the state shown in FIG. 8C can be further stabilized, and the accuracy of the origin point alignment can be sufficiently enhanced.

In the embodiment, it is determined that the first condition is satisfied when the pin movement amount (β1−β2) is equal to or larger than the reference movement amount Xβ, and it is determined that the second condition is satisfied when the shoulder displacement amount (α2−α1) is equal to or smaller than the reference displacement amount Xα. However, the first condition need only be a condition that the pin movement amount is included in a predetermined first range, and the second condition need only be a condition that the shoulder displacement amount is included in a predetermined second range. For example, the first range may be a range having not only a lower limit but also an upper limit, and the second range may be a range having a lower limit and an upper limit which are larger than zero.

Although in the above embodiment, when the pin member 11 is brought into contact with the backing member 15, a deviation of the Z-axis coordinate value of the pin member 11, i.e., a deviation between a target value and a current value of the Z-axis coordinate is examined, and determination is made that the pin member 11 has contacted the backing member 15 in a case where the deviation does not substantially change over a predetermined period, the method for determining the contact of the pin member 11 is not limited thereto. For example, as in the case of determining the contact of the shoulder member 12, the contact of the pin member 11 may be determined on the basis of the operating current of the servomotor 21a that drives the pin member 11.

CONCLUSION

The above-described embodiment and modifications thereof mainly include the following disclosure.

A control method according to one aspect of the present disclosure is a method for controlling a friction stir welding device that includes a pin member that rotates around an axis and moves forward and backward along the axis, and a shoulder member that is arranged on an outer peripheral side of the pin member, and rotates around the axis and moves forward and backward along the axis, and that welds a workpiece by press-fitting the pin member and the shoulder member into the workpiece while rotating the pin member and the shoulder member, the method including: a first step of storing, as a first shoulder position, a position of the shoulder member in the axial direction in a state where a distal end of the shoulder member is in contact with a predetermined contact surface; a second step of storing, as a first pin position, an initial position of the pin member in the axial direction; a third step of causing the pin member to advance toward the contact surface and storing, as a second pin position, a position of the pin member in the axial direction when a distal end of the pin member contacts the contact surface; a fourth step of storing, as a second shoulder position, a position in the axial direction of the shoulder member retreated as the pin member contacts the contact surface; a fifth step of determining whether or not a first condition is satisfied that a pin movement amount, which is a distance between the first pin position and the second pin position, is included in a predetermined first range, and whether or not a second condition is satisfied that a shoulder displacement amount, which is a distance between the first shoulder position and the second shoulder position, is included in a predetermined second range; a sixth step of causing the pin member to retreat from the contact surface by a predetermined return amount when the first condition and the second condition are satisfied, and performing origin point alignment of the pin member and the shoulder member with reference to positions of the pin member and the shoulder member in the axial direction after the retreat; and a seventh step of causing the pin member to retreat to a restart position farther from the contact surface than the first pin position when at least the first condition is not satisfied. After the seventh step, with the position of the pin member retreated to the restart position as a new first pin position, procedures of the second step and subsequent steps are re-executed.

According to the present control method, the pin movement amount, which is a movement distance when the pin member advances from the initial position to the contact surface, and the shoulder displacement amount, which is a displacement amount when the shoulder member retreats as the pin member comes into contact with the contact surface, are examined, and the origin point alignment of the pin member and the shoulder member is performed on the basis of these respective amounts. Specifically, when both the first condition that the pin movement amount is included in the first range and the second condition that the shoulder displacement amount is included in the second range are satisfied, the pin member is driven to retreat from the contact surface by the fixed return amount, and furthermore, the origin point alignment of the pin member and the shoulder member is performed on the basis of the positions of the pin member and the shoulder member in this state. As a result, it is possible to enhance efficiency and safety of the origin point alignment while securing the accuracy of the origin point alignment.

As a result of intensive studies by the inventors of the present application, it has been found that when the pin member is additionally brought into contact with the contact surface in a state where the shoulder member is in contact with the contact surface, the shoulder member slightly retreats as a result of the contact of the pin member, and a positional deviation of each distal end of the pin member and the shoulder member caused by the retreat is uniquely determined under specific conditions. Specifically, it has been found that the positional deviation is uniquely determined when each of the pin movement amount and the shoulder displacement amount is within a specific range. Based on such findings, in the present control method, it is determined whether the first condition that the pin movement amount is within the first range is satisfied or not, and whether the second condition that the shoulder displacement amount is within the second range is satisfied or not. When both the conditions are confirmed to be satisfied, the pin member is driven to retreat by a predetermined return amount. As a result, the position of the distal end of the pin member after retreat can be accurately matched with the position of the distal end of the shoulder member. Then, by performing origin point alignment of the pin member and the shoulder member in this state, the accuracy of the origin point alignment can be enhanced, and the welding performance of the friction stir welding device including the pin member and the shoulder member can be improved. For example, it is possible to improve the performance of finishing the welded part to be smooth.

Moreover, just by performing operation of sequentially bringing the shoulder member and the pin member into contact with the same contact surface to specify the positions of the shoulder member and the pin member at each stage as the first and second shoulder positions and the first and second pin positions, respectively, it is possible to determine whether the first condition is satisfied or not and whether the second condition is satisfied or not from the respective specified positions. In addition, when both the conditions are satisfied, the positions of the pin member and the shoulder member can be adjusted only by retreating the pin member by the fixed return amount. Therefore, origin point alignment can be easily performed while automating a series of the procedures, resulting in enhancing efficiency and safety of the origin point alignment.

On the other hand, when at least the first condition is not satisfied, the pin member retreats to the restart position farther away from the contact surface, and the same procedure is repeated at the position. Therefore, a situation in which the positions of the pin member and the shoulder member are adjusted can be realized as much as possible, and a probability that the origin point alignment is automatically performed can be increased.

Here, it is known that when the pin movement amount is large and the shoulder displacement amount is small, the above-described positional deviation, i.e., the positional deviation of each distal end of the pin member and the shoulder member caused by the retreat displacement of the shoulder member is easily stabilized. Therefore, it is preferable to set the first range to be a range equal to or larger than a predetermined reference movement amount, the second range to be a range equal to or smaller than a predetermined reference displacement amount, and the restart position to be a position away from the contact surface by a distance equal to or larger than the reference movement amount.

According to this configuration, it is possible to accurately determine whether or not the positional deviation can be uniquely determined depending on whether the first condition is satisfied or not and whether the second condition is satisfied or not. Even when the first condition is not satisfied, the first condition is always satisfied when the pin member is retreated to the restart position, so that the number of retries can be reduced.

More preferably, in the third step, the pin member is driven so that the pin member accelerates until reaching a predetermined target speed and then moves at a constant speed, and the reference movement amount is set to a distance or more necessary for increasing a moving speed of the pin member to the target speed.

According to this configuration, since it is guaranteed that the pin member has contacted the contact surface at a constant speed by the satisfaction of the first condition, the positional deviation when the first condition and the second condition are satisfied can be further stabilized, and the accuracy of the origin point alignment can be sufficiently enhanced.

A friction stir welding device according to another aspect of the present disclosure includes: a pin member that rotates around an axis and moves forward and backward along the axis; a shoulder member that is arranged on an outer peripheral side of the pin member, and rotates around the axis and moves forward and backward along the axis; a zeroing control unit that performs origin point alignment of the pin member and the shoulder member; a welding control unit that welds a workpiece by press-fitting the pin member and the shoulder member into the workpiece while rotating the pin member and the shoulder member; and a storage unit that stores data. The zeroing control unit is capable of executing: a first processing of causing the storage unit to store, as a first shoulder position, a position of the shoulder member in the axial direction in a state where a distal end of the shoulder member is in contact with a predetermined contact surface; a second processing of causing the storage unit to store, as a first pin position, an initial position of the pin member in the axial direction; a third processing of causing the pin member to advance toward the contact surface and causing the storage unit to store, as a second pin position, a position of the pin member in the axial direction when a distal end of the pin member contacts the contact surface; a fourth processing of causing the storage unit to store, as a second shoulder position, a position in the axial direction of the shoulder member retreated as the pin member contacts the contact surface; a fifth processing of determining whether or not a first condition is satisfied that a pin movement amount, which is a distance between the first pin position and the second pin position, is included in a predetermined first range, and whether or not a second condition is satisfied that a shoulder displacement amount, which is a distance between the first shoulder position and the second shoulder position, is included in a predetermined second range; a sixth processing of causing the pin member to retreat from the contact surface by a predetermined return amount when the first condition and the second condition are satisfied, and performing origin point alignment of the pin member and the shoulder member with reference to positions of the pin member and the shoulder member in the axial direction after the retreat; and a seventh processing of causing the pin member to retreat to a restart position farther from the contact surface than the first pin position when at least the first condition is not satisfied. After the seventh processing, with the position of the pin member retreated to the restart position as a new first pin position, the zeroing control unit re-executes the second processing and subsequent processings.

According to this friction stir welding device, it is possible to obtain the same effect as obtained by the control method described above.

The invention claimed is:

1. A method for controlling a friction stir welding device that includes a pin member that rotates around an axis and moves forward and backward along the axis, and a shoulder member that is on an outer peripheral side of the pin member, and rotates around the axis and moves forward and backward along the axis, and that welds a workpiece by press-fitting the pin member and the shoulder member into the workpiece while rotating the pin member and the shoulder member, the method comprising:
    a first step of storing, in a storage unit, as a first shoulder position, a position of the shoulder member in the axial direction in a state where a distal end of the shoulder member is in contact with a predetermined contact surface;
    a second step of storing, in the storage unit, as a first pin position, an initial position of the pin member in the axial direction;
    a third step of causing the pin member to advance toward the contact surface and storing, in the storage unit, as a second pin position, a position of the pin member in the axial direction when a distal end of the pin member contacts the contact surface;
    a fourth step of storing, in the storage unit, as a second shoulder position, a position in the axial direction of the shoulder member retreated as the pin member contacts the contact surface;
    a fifth step of determining that a first condition is satisfied in which a pin movement amount, which is a distance between the first pin position and the second pin position, is included in a predetermined first range, and that a second condition is satisfied in which a shoulder displacement amount, which is a distance between the first shoulder position and the second shoulder position, is included in a predetermined second range;
    a sixth step of causing the pin member to retreat from the contact surface by a predetermined return amount responsive to the first condition and the second condition being satisfied, and performing origin point alignment of the pin member and the shoulder member with reference to positions of the pin member and the shoulder member in the axial direction after the retreat;
    a seventh step of determining that the first condition is not satisfied; and
    an eighth step of causing the pin member to retreat to a restart position farther from the contact surface than the first pin position responsive to the first condition not being satisfied,
    wherein after the eighth step, with the position of the pin member retreated to the restart position as a new first pin position, procedures of the second step and subsequent steps are re-executed.

2. The method for controlling a friction stir welding device according to claim 1, wherein
    the first range is equal to or larger than a predetermined reference movement amount,
    the second range is equal to or smaller than a predetermined reference displacement amount, and
    the restart position is away from the contact surface by a distance equal to or larger than the reference movement amount.

3. The method for controlling a friction stir welding device according to claim 2, wherein
    in the third step, the pin member is driven so that the pin member accelerates until reaching a predetermined target speed and then moves at a constant speed, and
    the reference movement amount is a distance or more that is necessary for increasing a moving speed of the pin member to the target speed.

4. A friction stir welding device comprising:
    a pin member that rotates around an axis and moves forward and backward along the axis;
    a shoulder member that is on an outer peripheral side of the pin member, and rotates around the axis and moves forward and backward along the axis;
    a zeroing control unit configured to control origin point alignment of the pin member and the shoulder member;
    a welding control unit configured to control welding of a workpiece by press-fitting the pin member and the shoulder member into the workpiece while rotating the pin member and the shoulder member; and
    a storage unit that stores data,
    wherein the zeroing control unit includes a controller programmed to execute:
    a first processing of causing the storage unit to store, as a first shoulder position, a position of the shoulder member in the axial direction in a state where a distal end of the shoulder member is in contact with a predetermined contact surface;
    a second processing of causing the storage unit to store, as a first pin position, an initial position of the pin member in the axial direction;
    a third processing of causing the pin member to advance toward the contact surface and causing the storage unit to store, as a second pin position, a position of the pin member in the axial direction when a distal end of the pin member contacts the contact surface;
    a fourth processing of causing the storage unit to store, as a second shoulder position, a position in the axial direction of the shoulder member retreated as the pin member contacts the contact surface;
    a fifth processing of determining whether or not a first condition is satisfied in which a pin movement amount, which is a distance between the first pin position and the second pin position, is included in a predetermined first range, and whether or not a second condition is satisfied that a shoulder displacement amount, which is a distance between the first shoulder position and the second shoulder position, is included in a predetermined second range;
    a sixth processing of causing the pin member to retreat from the contact surface by a predetermined return amount when the first condition and the second condition are satisfied, and performing origin point alignment of the pin member and the shoulder member with reference to positions of the pin member and the shoulder member in the axial direction after the retreat; and
    a seventh processing of causing the pin member to retreat to a restart position farther from the contact surface than the first pin position when at least the first condition is not satisfied, and after the seventh processing, with the position of the pin member retreated to the restart position as a new first pin position, the zeroing control unit re-executes the second processing and subsequent processing.

5. A method for controlling a friction stir welding device that includes a pin member that rotates around an axis and moves forward and backward along the axis, and a shoulder member that is on an outer peripheral side of the pin member, and rotates around the axis and moves forward and backward along the axis, and that welds a workpiece by press-fitting the pin member and the shoulder member into the workpiece while rotating the pin member and the shoulder member, the method comprising:
- a first step of storing, in a storage unit, as a first shoulder position, a position of the shoulder member in the axial direction in a state where a distal end of the shoulder member is in contact with a predetermined contact surface;
- a second step of storing, in the storage unit, as a first pin position, an initial position of the pin member in the axial direction;
- a third step of causing the pin member to advance toward the contact surface and storing, in the storage unit, as a second pin position, a position of the pin member in the axial direction when a distal end of the pin member contacts the contact surface;
- a fourth step of storing, in the storage unit, as a second shoulder position, a position in the axial direction of the shoulder member retreated as the pin member contacts the contact surface;
- a fifth step of determining that a first condition is not satisfied in which a pin movement amount, which is a distance between the first pin position and the second pin position, is included in a predetermined first range; and
- a sixth step of causing the pin member to retreat to a restart position farther from the contact surface than the first pin position responsive to the first condition not being satisfied,
- wherein after the sixth step, with the position of the pin member retreated to the restart position as a new first pin position, procedures of the second step and subsequent steps are re-executed.

6. A method for controlling a friction stir welding device that includes a pin member that rotates around an axis and moves forward and backward along the axis, and a shoulder member that is on an outer peripheral side of the pin member, and rotates around the axis and moves forward and backward along the axis, and that welds a workpiece by press-fitting the pin member and the shoulder member into the workpiece while rotating the pin member and the shoulder member, the method comprising:
- a first step of storing, in a storage unit, as a first shoulder position, a position of the shoulder member in the axial direction in a state where a distal end of the shoulder member is in contact with a predetermined contact surface;
- a second step of storing, in the storage unit, as a first pin position, an initial position of the pin member in the axial direction;
- a third step of causing the pin member to advance toward the contact surface and storing, in the storage unit, as a second pin position, a position of the pin member in the axial direction when a distal end of the pin member contacts the contact surface;
- a fourth step of storing, in the storage unit, as a second shoulder position, a position in the axial direction of the shoulder member retreated as the pin member contacts the contact surface;
- a fifth step of determining that a first condition is satisfied in which a pin movement amount, which is a distance between the first pin position and the second pin position, is included in a predetermined first range, and that a second condition is satisfied in which a shoulder displacement amount, which is a distance between the first shoulder position and the second shoulder position, is included in a predetermined second range; and
- a sixth step of causing the pin member to retreat from the contact surface by a predetermined return amount responsive to the first condition and the second condition being satisfied, and performing origin point alignment of the pin member and the shoulder member with reference to positions of the pin member and the shoulder member in the axial direction after the retreat.

* * * * *